United States Patent
Snijder

(10) Patent No.: US 9,127,820 B2
(45) Date of Patent: Sep. 8, 2015

(54) INTELLIGENT LIGHTING TILE SYSTEM POWERED FROM MULTIPLE POWER SOURCES

(75) Inventor: Pieter Jacob Snijder, Valkenswaard (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 573 days.

(21) Appl. No.: 13/322,965

(22) PCT Filed: May 25, 2010

(86) PCT No.: PCT/IB2010/052295
§ 371 (c)(1),
(2), (4) Date: Nov. 29, 2011

(87) PCT Pub. No.: WO2010/136954
PCT Pub. Date: Dec. 2, 2010

(65) Prior Publication Data
US 2012/0074784 A1      Mar. 29, 2012

(30) Foreign Application Priority Data

May 29, 2009   (EP) ..................................... 09161523

(51) Int. Cl.
*H02J 1/10* (2006.01)
*F21S 2/00* (2006.01)
(Continued)

(52) U.S. Cl.
CPC ................. F21S 2/005 (2013.01); F21V 23/04 (2013.01); H05B 37/0281 (2013.01); *Y02B 20/42* (2013.01); *Y02B 20/48* (2013.01); *Y10T 307/549* (2015.04)

(58) Field of Classification Search
USPC .............. 307/43, 44, 52, 82, 85, 93, 150, 152
See application file for complete search history.

(56) References Cited

U.S. PATENT DOCUMENTS

| 5,459,477 A | 10/1995 | Fukuda et al. |
| 5,714,847 A | 2/1998 | Lindauer et al. |

(Continued)

FOREIGN PATENT DOCUMENTS

| CN | 101322443 1 | 12/2008 |
| DE | 19540146 A1 | 5/1996 |

(Continued)

OTHER PUBLICATIONS

Wei et al., "A new approach to the traveling salesman problem using genetic algorithms with priority encoding", pp. 1457-1464, Taiwan, (Feb. 4, 2004).

(Continued)

*Primary Examiner* — Rexford Barnie
*Assistant Examiner* — Xuan Ly
(74) *Attorney, Agent, or Firm* — Yuliya Mathis

(57) ABSTRACT

This invention relates to a power unit for a lighting system. Said power unit includes a mains power input (2), output terminals (3a, 3b) and a power supply (5) for regulating a supply voltage (V1) of the power unit (1). The power unit further comprises a polarity detector (13), a voltmeter (11) for measuring a voltage (V2) at said output terminals (3a, 3b) and a current meter (12) for measuring a current (A) at said output terminals (3a, 3b). The power unit also comprises a control unit (7), wherein said control unit (7) is arranged to initiate a power up procedure delay of random length after the power unit (1) has been switched on and wherein said control unit (7) is arranged to process information from the voltmeter (11), the current meter (12) and the polarity detector (13), and to control a power output of the power unit (1) on basis of said information.

15 Claims, 2 Drawing Sheets

(51) Int. Cl.
   *F21V 23/04*   (2006.01)
   *H05B 37/02*   (2006.01)

(56) References Cited

U.S. PATENT DOCUMENTS

| | | | |
|---|---|---|---|
| 5,986,622 | A | 11/1999 | Ong |
| 6,150,996 | A | 11/2000 | Nicholson et al. |
| 6,501,441 | B1 | 12/2002 | Ludtke et al. |
| 6,784,458 | B1 | 8/2004 | Wang et al. |
| 7,307,542 | B1 | 12/2007 | Chandler et al. |
| 2002/0079849 | A1* | 6/2002 | Mason et al. ............ 315/291 |
| 2003/0147400 | A1 | 8/2003 | Devi |
| 2005/0264470 | A1 | 12/2005 | Neervoort et al. |
| 2007/0279424 | A1 | 12/2007 | Keeney et al. |
| 2008/0297072 | A1* | 12/2008 | Snijder et al. ............ 315/312 |
| 2008/0309259 | A1 | 12/2008 | Snijder et al. |

FOREIGN PATENT DOCUMENTS

| | | | |
|---|---|---|---|
| DE | 102004043197 A1 | 3/2006 |
| EP | 1519106 A2 | 2/1998 |
| EP | 1276354 A1 | 1/2003 |
| JP | 05046590 A | 2/1993 |
| JP | 2002502217 A | 1/2002 |
| JP | 2005517278 A | 6/2005 |
| JP | 2005526582 A | 9/2005 |
| JP | 2006216535 A | 8/2006 |
| JP | 2007227018 A | 9/2007 |
| JP | 2009517830 A | 4/2009 |
| WO | 0193242 A1 | 12/2001 |
| WO | 02063416 A2 | 8/2002 |
| WO | 2006129272 A2 | 12/2006 |
| WO | 2007063487 A1 | 6/2007 |
| WO | 2007069130 A2 | 6/2007 |
| WO | 2007072319 A1 | 6/2007 |
| WO | 2008033720 A1 | 3/2008 |
| WO | 2008035282 A1 | 3/2008 |
| WO | 2008044167 A1 | 4/2008 |
| WO | 2008051464 A1 | 5/2008 |
| WO | 2008059412 A1 | 5/2008 |
| WO | 2008120132 A1 | 10/2008 |
| WO | 2010136956 A1 | 12/2010 |
| WO | 2010136998 A1 | 12/2010 |

OTHER PUBLICATIONS

Piet Snijder; "Intelligent Tiles Design Flow", Philips Research, Group Visual Experiences, Aug. 21, 2007.

* cited by examiner

INTELLIGENT LIGHTING TILE SYSTEM POWERED FROM MULTIPLE POWER SOURCES

FIELD OF THE INVENTION

The present invention relates to power supplies and more specifically to the power supply of a modular lighting system comprising a plurality of interconnectable polygonal lighting modules.

BACKGROUND OF THE INVENTION

Modular lighting refers to modules that can be assembled in order to obtain large lighting devices of various sizes and shapes. Each lighting module has several light elements, e.g. RGB LEDs. In addition to the flexibility in adapting the size and shape of such modular lighting applications, e.g. to the available space where the modular lighting application is to be installed or due to other reasons, such modular lighting applications may be used to visualize lighting patterns, including still and moving images and light effects, on a screen that may have a size and a shape that in general deviates from standard rectangular liquid crystal display (LCD) devices. Particularly two-dimensional lighting modules are typically referred to as lighting tiles, or simply tiles. Such a lighting tile may have various polygonal shapes, such as for example a square, triangle or pentagon shape. The lighting tiles are not limited to two-dimensional shapes but may have a three-dimensional shape, such as a cube or a pyramid.

The shape and size of the lighting system can be changed by adding, removing and relocating lighting tiles. Obviously, by varying the number of tiles in the system, the power demand will vary as well. A user employing only a small number of lighting tiles is most likely reluctant to buy a very powerful and expensive power unit dimensioned for a system comprising a high number of lighting tiles which he may never use to the full. Another issue with such a single power unit solution is that the internal wiring of the lighting tiles would all have to be dimensioned for a load in accordance with the maximum capacity of the single power unit.

The optimal solution to this would be to distribute mains power among the tiles and provide each of the tiles with its own power converter fulfilling the power demands of that specific tile. This would have many advantages, one being that no external power unit is needed which would simplify the system considerably. Another advantage would be that, with each tile having a mains power converter, such a distributed power supply is auto-scaling by itself avoiding the question of which capacity a single external power unit should have. The distribution of mains power among the tiles is, however, prohibited due to safety regulations. Therefore, large systems of lighting tiles have to be powered by a plurality of power units. One lighting system of this kind is disclosed in WO 2007/069130. In that prior art system, the lighting tiles have an internal wiring which make the tiles easy to fit since the rotational orientation of each tile relative to the neighboring tiles is non-essential. In that document one lighting system is mentioned where one power unit is capable of powering up to 10 tiles which means that for more advanced arrangements a considerable number of power units are necessary.

SUMMARY OF THE INVENTION

The invention is based on the observation that when using more than one power unit in a system of, for example, lighting tiles of the kind mentioned in WO 2007/069130 it is not always possible to determine beforehand the polarities appearing at the power terminals of the lighting tiles, imposed by an already attached power unit. Normally, polarity problems are avoided by using asymmetrical adapters. If, however, it is not known beforehand which polarity each power terminal of the lighting tiles will have, the asymmetry is of no use and there is a major risk that a short circuit will be introduced when more than one power unit is hooked on to the system. It is therefore an object of the present invention to provide a power unit which can be used in a system comprising a plurality of such power units without the risk of introducing short circuits resulting from conflicting polarities. This object is achieved with a power unit according to a representative embodiment of the present invention. It is also achieved with a lighting system according to a representative embodiment and a method for powering a lighting system according to another representative embodiment.

Consequently, in accordance with an aspect of the invention, there is provided a power unit comprising a mains power input, output terminals, a power supply for regulating a supply voltage of the power unit, a voltmeter for measuring a voltage at said output terminals, a current meter for measuring a current at said output terminals and a polarity detector. The power unit further comprises a control unit, wherein said control unit is arranged to initiate a power up procedure delay of random length after the power unit has been switched on and wherein said control unit is further arranged to process information from the voltmeter, the current meter and the polarity detector, and to control a power output of the power unit on basis of said information.

In accordance with an embodiment of the power unit, a crossbar switch is provided for aligning polarities.

In accordance with an embodiment of the power unit, a current limiter is implemented in order to protect the system against temporary shorts.

In accordance with an embodiment of the power unit, an anti-surge circuit limiting the output current in a time-varying way is provided in order to avoid sudden current surges at the very moment of connecting the power unit to the system.

In accordance with an embodiment of the power unit, a diode, or a circuit acting as a diode, is provided in series with its output terminals in order to avoid that power units feed each other.

According to another aspect of the present invention, there is provided a lighting system, comprising a plurality of interconnectable polygonal lighting tiles and a plurality of power units according to various representative embodiments.

According to a further aspect of the present invention, there is provided a method of powering a system comprising a plurality of power units, wherein said method comprises the following steps, being performed by each of the power units upon starting-up thereof. First a power up procedure delay of random length is initiated. Thereafter a voltage is measured at output terminals of the power unit at the end of the power up procedure delay and a current is also measured at said output terminals of the power unit at the end of the power up procedure delay and it is determined if there are any polarity conflicts. Then the information collected in the preceding steps is processed and a power output of the power unit is controlled on basis of said processing.

It is noted that the invention relates to all possible combinations of features recited in the claims.

BRIEF DESCRIPTION OF THE DRAWINGS

This and other aspects of the present invention will now be described in more detail, with reference to the appended drawings showing a currently preferred embodiment of the invention.

DETAILED DESCRIPTION

Figure 1:
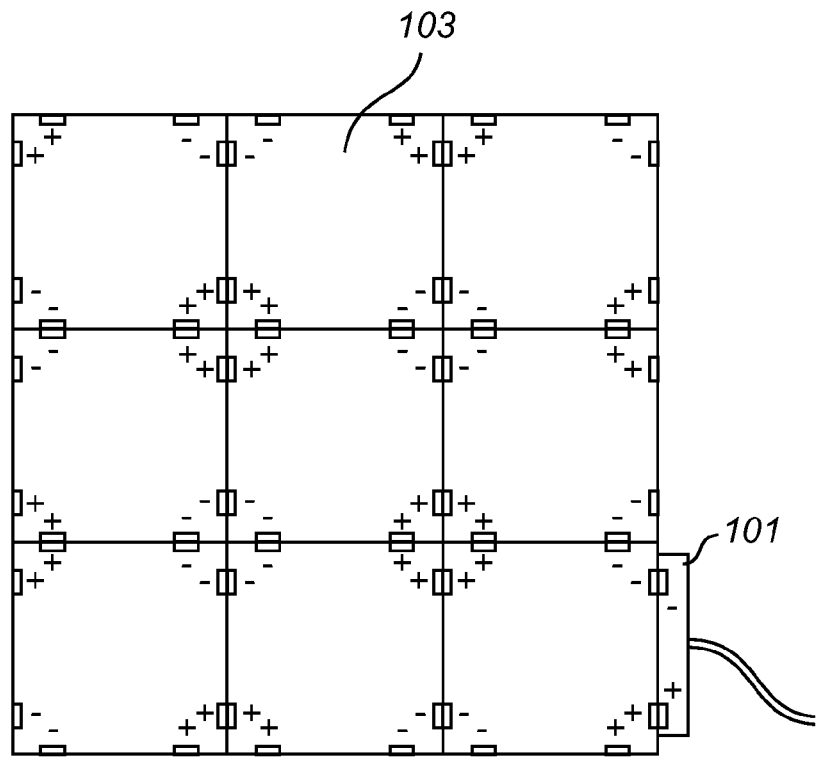
FIG. 1 illustrates a configuration of lighting tiles with one single power unit attached thereto.

FIG. 1 illustrates a lighting system comprising a power unit 101 and an array of lighting modules, or lighting tiles, 103 and only one power unit 101 has been connected so far. In FIG. 1, the polarity distribution imposed by the power unit 101 is demonstrated. This distribution is due to the fixed internal power distribution scheme inside each tile 103, which makes it possible to attach and remove tiles without having to consider the orientation of each tile in relation to the other tiles in order to obtain a short-circuit free system. This means that the polarity appearing at terminals at the edge of any given tile 103 in the lighting system depends on its position with respect to the tile onto which the power unit 101 is attached and on the polarity imposed by said power unit 101.

Figure 2:
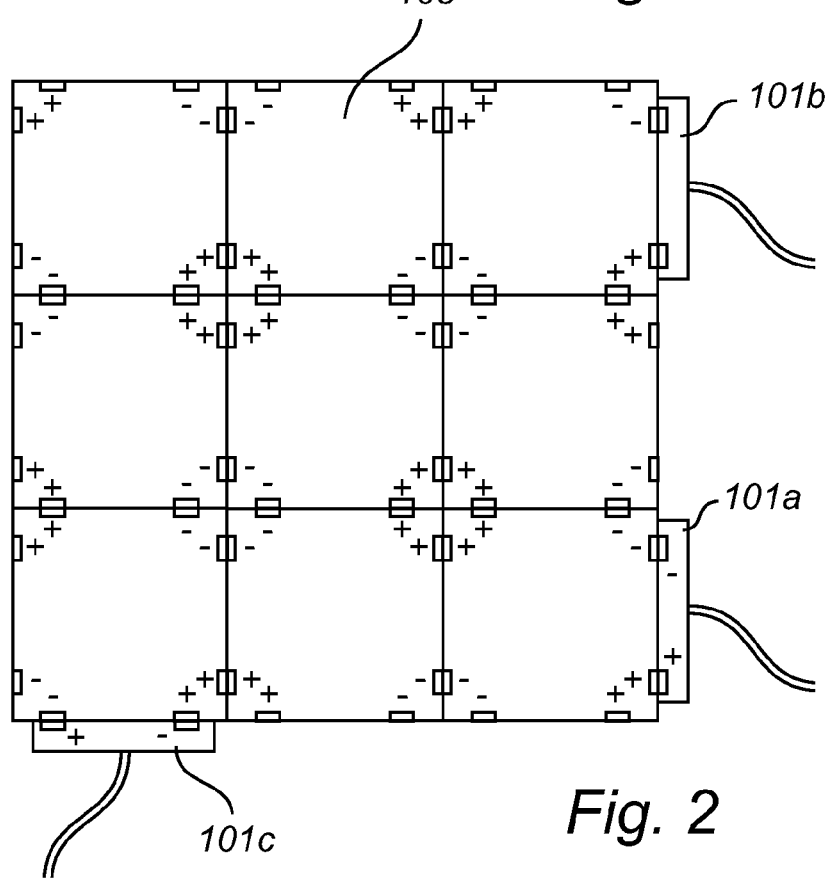
FIG. 2 illustrates a configuration of lighting tiles to which three power units with partially conflicting polarities are attached.

If the power demand of the lighting system exceeds that of a single power unit 101, further units have to be attached to the array of lighting tiles. If further power units with fixed polarities are used, a situation as shown in FIG. 2 may occur. A first power unit 101a is the initial one, imposing the polarities for the whole system as shown also in FIG. 1. Second and third power units 101b, 101c, identical to the first power unit 101a, are then attached to the array. As can be seen in FIG. 2, the polarity of second power unit 101b agrees with that of first power unit 101a and will not give rise to any short circuits. But, due to the power interconnection scheme of the tiles 103, the polarity of third power unit 101c will be in conflict with that of the first power unit 101a and will give rise to a short-circuit in the system. Reversal of the connection of power unit 101c to the tile is not possible when using asymmetric adapters since they can only be fitted in one position and cannot be reversed. The power unit 101c will have to be moved to another tile side to avoid short-circuit problems, which is not particularly user-oriented.

Figure 3:
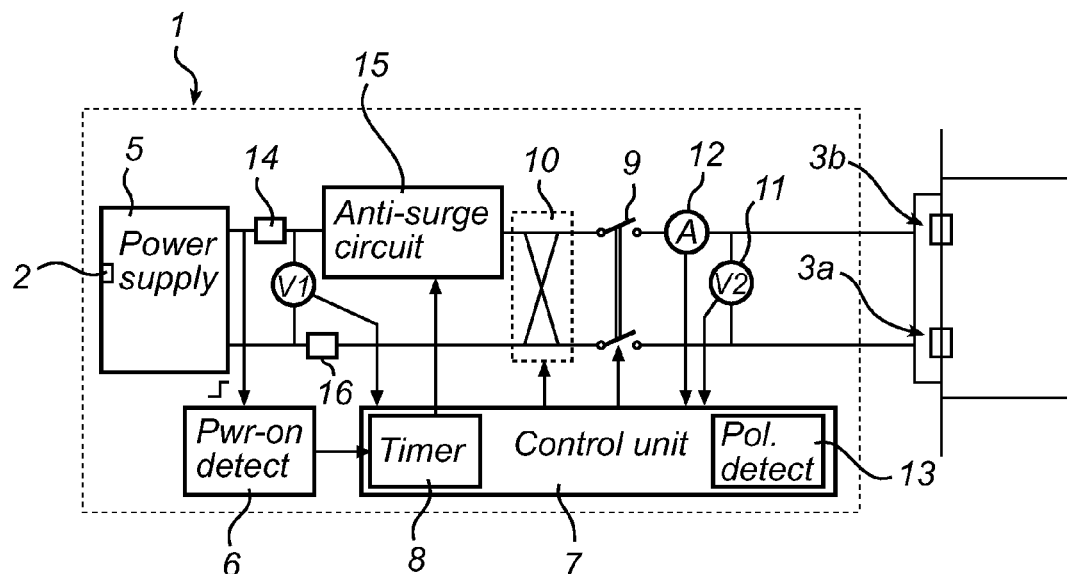
FIG. 3 illustrates a diagrammatic wiring layout of an embodiment of a power unit according to the invention.

FIG. 3 shows an embodiment of a power unit 1 in accordance with the present invention. The power unit 1 comprises a mains power input 2 through which the power unit 1 can be connected to a mains outlet, and two output terminals 3a, 3b by means of which the power unit 1 can be connected to for example a lighting tile. The power unit 1 further comprises a power supply 5 which regulates the supply voltage V1 of the power unit 1 to a value which is desired in the actual system where it is to be used. This value can be adjustable through a voltage selector or it can be set to a fixed value to avoid that it inadvertently is set to an incorrect value. The power unit 1 also comprises a power-on detector 6, a power transfer switch 9 and a control unit 7 comprising a timer 8, the purpose of which is to initiate a power up procedure delay of random length immediately after the power unit 1 has been switched on. The power-on detector 6 detects the rising edge of the supply voltage V1 output from the power supply 5 which initiates the timer 8. During this delay, the control unit 7 disconnects the power transfer switch 9 and consequently no power is transferred to the output terminals 3a, 3b. The delay imposed may for example be multiples of 500 milliseconds. In addition, the power unit 1 comprises a volt meter 11 for measuring a voltage V2, which will also be named second voltage, at the output terminals 3a, 3b as well as a current meter 12 for measuring a current A also at the output terminals 3a, 3b. The control unit 7 further comprises a polarity detector 13, and the control unit 7 controls a cross-bar switch 10 which, if the supply voltage V1 and the second voltage V2 have conflicting polarities, is able to align said polarities. The polarity detector 13 can for example be constituted by a separate circuit comprising a diode or a circuit acting as a diode. The polarity detection may, however, also be done by the control unit 7 by evaluating the measured second voltage V2 and current A at the output terminals 3a, 3b of the power unit 1. An excessive increase of the current while the voltage remains at or close to zero indicates conflicting polarities. The power unit 1 is also provided with a current limiter 14 protecting the system against temporary shorts, and in order to avoid that sudden current surges arise at the very moment of connecting the power unit 1 to a system, the power unit 1 also comprises an anti-surge circuit 15. This anti-surge circuit 15, sometimes also named hot-swap controller, acts as an electronically controlled resistor taking care of a graceful increase of supply current from zero to its final value in a time varying way. A diode, or a circuit acting as such a diode, is connected in series with the output terminals 3a, 3b between the power supply 5 and the cross-bar switch 10 in order to avoid that separate power units feed each other. It should be noted that some of the functions in FIG. 3 may be interchanged or combined. It would, for example, be possible to interchange the cross-bar switch 10 and power transfer switch 9 or to combine them into two 3-position switches. Also, the current limiter 14 and the anti-surge circuit 15 may be combined. Furthermore, the switches may also be implemented by electronic means, such as transistor based switches.

The operation of the power unit according to this invention, in a lighting system comprising three identical power units connected in parallel, will now be explained. It should be noted though, that the procedure described below will work in a system having an arbitrary number of power units and is by no means limited to only three power units.

Figure 4:
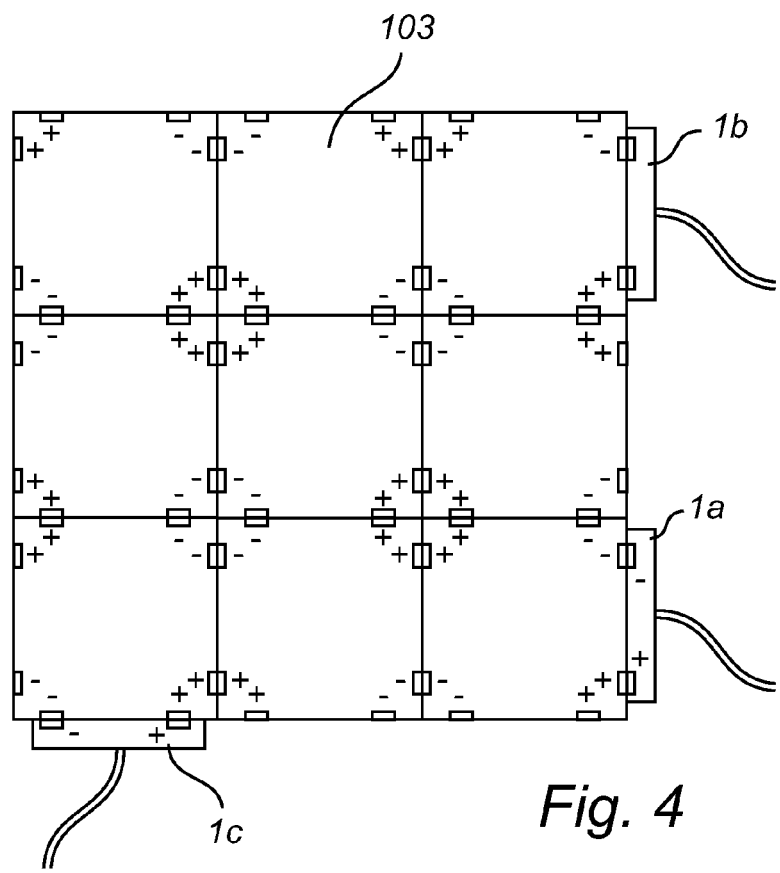
FIG. 4 illustrates a configuration of a system lighting tiles with three power units attached thereto.

Referring to FIG. 4, three power units 1a, 1b, 1c, identical to that described in FIG. 3, are switched on to the mains simultaneously and immediately thereafter the power supply of each power unit 1a, 1b, 1c regulates its supply voltage V1 to the desired value, i.e. the value suitable for the array of lighting tiles to which the power units 1a, 1b, 1c are attached. Subsequently, the control unit of each power unit 1a, 1b, 1c initiates a delay of random length in the power up procedure. During this period of time no power is distributed to the output terminals of the power units 1a, 1b, 1c. Suppose now that the power up procedure delay of the first power unit 1a is the shortest of the three. At the end of the delay both the second voltage V2 and the current A are measured at the output terminals of said first power unit 1a. Since no power is transferred from the second and the third power units 1b, 1c during their respective power up procedure delay, the second voltage V2 and the current A will both be zero. This has the result that the supply voltage V1 of first power unit 1a is transferred from the power supply to the output terminals thereof. This is done via the anti-surge circuit, which takes care of a smooth and continuous increase of the current from zero onwards in order to avoid sudden current surges at the very moment of connection. To avoid unwanted interferences, this is done within a time span which is shorter than the shortest power up procedure delay as the current should have reached its end-value before measurements by a next starting power unit are performed. This means that if the power up procedure delay is defined as multiples of 500 milliseconds, the increase of the current should be done within 500 milliseconds since this would be the shortest possible power up procedure delay. Assume now that the power up procedure delay of the second power unit 1b ends next. When the second voltage V2 is measured at the output terminals of said second power unit 1b a non-zero voltage will be found, the absolute value of which will be equal to the target voltage, since the first power unit 1a is already connected to the array. This has the result that the second power unit 1b will transfer the supply voltage to its output terminals, again via an anti-surge circuit. If a polarity conflict exists between the output voltages of said first and second power units 1a, 1b, the polarity detector of the control unit in the second power unit 1b will sense this and the control unit will activate the cross-bar switch of the second power unit 1b in order to align the polarity with that of the first power unit 1a before the voltage is transferred to its outputs and the anti-surge circuit is activated. Finally, the power up procedure delay of the third power unit 1c will come to an end and the third power unit will connect to the system in the same way as the second power unit 1b did.

It is also possible that the power up procedure delay of random length of more than one power unit ends at the same time. Assuming again that the system comprises three power units 1a, 1b, 1c and that the power up procedure delay of first and second power units 1a and 1b end simultaneously and before that of third power unit 1c the following will happen:

First and second power units 1a, 1b will simultaneously measure the second voltage V2 and the current A at their respective output terminals. Since no power unit is distributing any power to the system at this point, the second voltage V2 of the first and second power units 1a, 1b will be zero. This results in that the regulated supply voltage V1 of each of the power units 1a, 1b is transferred to the respective output terminal via a respective anti-surge circuit. If the polarities of the first and second power units 1a, 1b powering up simultaneously agree, both the second voltage V2 and the current A will ramp up increasingly. These two power units 1a, 1b will now act as master units and the third power unit 1c will, at the end of its power up procedure delay, adopt its polarity to that of those two as described above where the power up procedure delay of the power units 1a, 1b, 1c end one after another.

If, however, the polarities of the first and second power units 1a, 1b do not agree, the second voltage V2 remains close to zero after the end of the power up procedure delay whereas the current A increases considerably. This condition initiates a new power up procedure delay for both power units 1a, 1b. The procedure is iterated until all power units 1a, 1b, 1c are properly hooked up to the system.

Consequently, as explained above, a user-friendly and safe solution for how to use a plurality of power units together in a system is obtained.

The person skilled in the art realizes that the present invention by no means is limited to the preferred embodiments described above. On the contrary, many modifications and variations are possible within the scope of the appended claims.

The invention claimed is:

1. A power unit, said power unit comprising
a mains power input;
output terminals;
a power supply for regulating a supply voltage of the power unit;
a voltmeter for measuring a voltage at said output terminals;
a current meter for measuring a current at said output terminals;
a polarity detector;
a control unit;
wherein said control unit is configured to initiate a power up procedure delay of random length after the power unit has been switched on, thereby delaying a transfer of the supply voltage to the output terminals of the power unit, and
wherein said control unit is configured to process information from the voltmeter, the current meter and the polarity detector, and to control a power output of the power unit on basis of said information, and
wherein the polarity detector is configured to determine if there is a polarity conflict at the output terminals, the control unit being further configured to control the polarity of the supply voltage transferred to the output terminals on basis of the determination.

2. A power unit according to claim 1, wherein the power unit comprises a crossbar switch for aligning polarities at the output terminals.

3. A power unit according to claim 1, comprising a current limiter.

4. A power unit according to claim 1, comprising an anti-surge circuit limiting the output current in a time-varying way.

5. A power unit according to claim 4, wherein the anti-surge unit is capable of performing a current increase from zero to its end value faster than a shortest possible power up procedure delay of random length.

6. A power unit according to claim 1, comprising a power transfer switch.

7. A power unit according to claim 1, comprising a diode in series with its output terminals.

8. A power unit according to claim 1, comprising a circuit acting as a diode in series with its output terminals.

9. A lighting system, comprising a plurality of interconnectable polygonal lighting modules and a plurality of power units according to claim 1.

10. A method of powering a system comprising a plurality of power units, wherein said method comprises the following steps, being performed by each of the power units upon starting-up thereof:
a) regulating a supply voltage and initiating a power up procedure delay of random length;
b) measuring a voltage at output terminals of the power unit at the end of the power up procedure delay of random length;
c) measuring a current at said output terminals of the power unit at the end of the power up procedure delay of random length;
d) determining if there are any polarity conflicts;
e) processing information collected in steps b-d,
f) controlling a power output of the power unit on basis of said processing, including controlling the polarity of the supply voltage transferred to the output terminals on basis of said determination.

11. A method of powering a system comprising a plurality of power units according to claim 10, wherein the voltage being close to zero in step b implies that the controlling of the power output of the power unit in step f includes a transfer of the supply voltage to the output terminals.

12. A method of powering a system comprising a plurality of power units according to claim 11, wherein, after the supply voltage has been transferred to the output terminals, the voltage remaining close to zero whereas a rapid rise of the current is measured implies that a new power up procedure delay of random length according to step a is initiated.

13. A method of powering a system comprising a plurality of power units according to claim 10, wherein the voltage being close to a target voltage in step b leads up to a polarity check in step d and if a polarity conflict is found the controlling of the supply voltage of the power unit in step f includes a polarity alignment followed by a transfer of the supply voltage to the output terminals of the power unit, if no polarity conflict is found a transfer of the power output to the output terminals of the power unit can be effected without such an alignment.

14. A method of powering a system comprising a plurality of power units according to claim 10, wherein the controlling in step f comprises performing a current increase by means of an anti-surge circuit, said current increase being finished in a shorter time than a shortest power up procedure delay.

15. A method of powering a system comprising a plurality of power units according to claim 10, wherein the power up procedure delay of random length is multiples of 500 milliseconds.

\* \* \* \* \*